United States Patent
Kamaga et al.

(10) Patent No.: US 11,413,530 B2
(45) Date of Patent: Aug. 16, 2022

(54) INFORMATION PROCESSING APPARATUS, INFORMATION PROCESSING SYSTEM, NON-TRANSITORY COMPUTER READABLE MEDIUM, AND VEHICLE

(71) Applicant: TOYOTA JIDOSHA KABUSHIKI KAISHA, Toyota (JP)

(72) Inventors: Ryuichi Kamaga, Nisshin (JP); Kouki Moriya, Nagakute (JP); Yui Ogura, Nagoya (JP); Shintaro Matsutani, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/166,889

(22) Filed: Feb. 3, 2021

(65) Prior Publication Data

US 2021/0236930 A1    Aug. 5, 2021

(30) Foreign Application Priority Data

Feb. 3, 2020   (JP) .............................. JP2020-016270

(51) Int. Cl.
*A63F 13/53*   (2014.01)
*H04L 67/12*   (2022.01)

(52) U.S. Cl.
CPC .............. *A63F 13/53* (2014.09); *H04L 67/12* (2013.01)

(58) Field of Classification Search
CPC ........ A63F 13/53; A63F 13/216; A63F 13/35; A63F 13/212; A63F 13/25; H04L 67/12
See application file for complete search history.

(56) References Cited

U.S. PATENT DOCUMENTS

| | | | |
|---|---|---|---|
| 2005/0090307 A1* | 4/2005 | Walker | A63F 9/183 463/20 |
| 2015/0097864 A1* | 4/2015 | Alaniz | G06T 7/20 345/633 |
| 2016/0310843 A1* | 10/2016 | Webb | A63F 13/86 |
| 2018/0040163 A1* | 2/2018 | Donnelly | G06F 3/017 |
| 2018/0357233 A1* | 12/2018 | Daze | G06F 16/435 |
| 2019/0381406 A1* | 12/2019 | Jung | A63F 13/216 |
| 2020/0073954 A1* | 3/2020 | DeLuca | G06F 3/165 |
| 2021/0339144 A1* | 11/2021 | Gray | G06F 9/4451 |

FOREIGN PATENT DOCUMENTS

JP       2001-277932 A       10/2001

* cited by examiner

*Primary Examiner* — Thomas J Hong
*Assistant Examiner* — Carl V Larsen
(74) *Attorney, Agent, or Firm* — Oliff PLC

(57) ABSTRACT

An information processing apparatus for supporting provision of a gaming environment in the cabin of a vehicle includes a controller. The controller acquires, for each of one or more users, gaming environment information and play information associated with the gaming environment information, when the one or more users play a game using the gaming environment and optimizes the gaming environment provided to one user based on the acquired gaming environment information and the acquired play information.

20 Claims, 8 Drawing Sheets

| GAMING ENVIRONMENT INFORMATION || PLAY INFORMATION ||
|---|---|---|---|
| USER | GAMING ENVIRONMENT | PLAY NUMBER | PLAY PERFORMANCE |
| A | CONFIGURATION 1 | PA1 | 300 |
|   | CONFIGURATION 2 | PA2 | 100 |
|   | CONFIGURATION 4 | PA3 | 600 |
|   | ⋮ | ⋮ | ⋮ |
| B | CONFIGURATION 2 | PB1 | 200 |
|   | CONFIGURATION 3 | PB2 | 1000 |
|   | CONFIGURATION 5 | PB3 | 500 |
|   | ⋮ | ⋮ | ⋮ |
| ⋮ | ⋮ | ⋮ | ⋮ |

| GAMING ENVIRONMENT INFORMATION | | PLAY INFORMATION | |
|---|---|---|---|
| USER | GAMING ENVIRONMENT | PLAY NUMBER | PLAY PERFORMANCE |
| A | CONFIGURATION 1 | PA1 | 300 |
| | CONFIGURATION 2 | PA2 | 100 |
| | CONFIGURATION 4 | PA3 | 600 |
| | ⋮ | ⋮ | ⋮ |
| B | CONFIGURATION 2 | PB1 | 200 |
| | CONFIGURATION 3 | PB2 | 1000 |
| | CONFIGURATION 5 | PB3 | 500 |
| | ⋮ | ⋮ | ⋮ |
| ⋮ | ⋮ | ⋮ | ⋮ |

FIG. 4

| GAMING ENVIRONMENT INFORMATION | | BIOLOGICAL INFORMATION | |
|---|---|---|---|
| USER | GAMING ENVIRONMENT | INFORMATION NUMBER | BIOLOGICAL STATE |
| A | CONFIGURATION 1 | A1 | AVERAGE |
| | CONFIGURATION 2 | A2 | POOR |
| | CONFIGURATION 4 | A3 | GOOD |
| | ⋮ | ⋮ | ⋮ |
| B | CONFIGURATION 2 | B1 | POOR |
| | CONFIGURATION 3 | B2 | BEST |
| | CONFIGURATION 5 | B3 | GOOD |
| | ⋮ | ⋮ | ⋮ |
| ⋮ | ⋮ | ⋮ | ⋮ |

FIG. 5

| EVENT INFORMATION | | | | |
|---|---|---|---|---|
| GAME EVENT | VENUE | START DATE AND TIME | END DATE AND TIME | CONTENT OF GAME |
| X | NAGOYA CITY | 2020 JANUARY 1ST 10:00 | 2020 JANUARY 1ST 12:00 | FIGHTING VIDEO GAME |
| Y | CHIYODA WARD | 2020 JANUARY 6TH 15:00 | 2020 JANUARY 6TH 17:00 | SHOOTING VIDEO GAME |
| ⋮ | ⋮ | ⋮ | ⋮ | ⋮ |

FIG. 6

| USER INFORMATION | | | |
|---|---|---|---|
| USER | ADDRESS | DATE THE USER CAN PARTICIPATE | CONTENT OF GAME |
| A | KYOTO CITY | 2020 JANUARY 10TH | RACING VIDEO GAME |
| B | NAGOYA CITY | 2020 JANUARY 1ST | FIGHTING VIDEO GAME |
| ⋮ | ⋮ | ⋮ | ⋮ |

INFORMATION PROCESSING APPARATUS, INFORMATION PROCESSING SYSTEM, NON-TRANSITORY COMPUTER READABLE MEDIUM, AND VEHICLE

CROSS-REFERENCE TO RELATED APPLICATION

This application claims priority to Japanese Patent Application No. 2020-016270, filed Feb. 3, 2020, the entire contents of which are incorporated herein by reference.

TECHNICAL FIELD

The present disclosure relates to an information processing apparatus, an information processing system, a program, and a vehicle.

BACKGROUND

Technology related to mobile vehicles for holding events, such as classes, in the cabin of a vehicle are known. For example, patent literature (PTL) 1 discloses a mobile classroom vehicle provided with a space for musical instrument performance in the vehicle and musical instruments installed in the space. Music lessons can be held in the vehicle using the instruments.

E-sports, in which a match using a video game is played as a sporting competition, have become popular in recent years. For example, games, including video games played as e-sports, can be played by various users using a gaming environment in the cabin of a vehicle.

CITATION LIST

Patent Literature

PTL 1: JP 2001-277932 A

SUMMARY

When various users play a game using the gaming environment provided in the cabin of a vehicle, the gaming environment may not be suitable depending on the user, and there is a possibility that the game-related performance of the user will decrease. In general, a user wishes to improve their game-related performance with a gaming environment provided in the cabin of the vehicle that is optimized for the user.

It would be helpful to enable improvement of the game-related performance of a user in a gaming environment provided in the cabin of the vehicle.

An information processing apparatus according to an embodiment of the present disclosure is for supporting provision of a gaming environment in a cabin of a vehicle. The information processing apparatus includes a controller configured to acquire, for each of one or more users, gaming environment information and play information associated with the gaming environment information, when the one or more users play a game using the gaming environment and optimize the gaming environment provided to one user based on the acquired gaming environment information and the acquired play information.

A program according to an embodiment of the present disclosure is configured to cause an information processing apparatus for supporting provision of a gaming environment in a cabin of a vehicle, to execute operations including acquiring, for each of one or more users, gaming environment information and play information associated with the gaming environment information, when the one or more users play a game using the gaming environment; and optimizing the gaming environment provided to one user based on the acquired gaming environment information and the acquired play information.

A vehicle according to an embodiment of the present disclosure is for providing a gaming environment in a cabin of the vehicle with assistance from an information processing apparatus. The vehicle includes a controller configured to acquire, for each of one or more users, gaming environment information and play information associated with the gaming environment information, when the one or more users play a game using the gaming environment, and provide one user with a gaming environment optimized for the one user by the information processing apparatus based on the gaming environment information and the play information acquired from the vehicle by the information processing apparatus.

According to the information processing apparatus, the information processing system, the non-transitory computer readable medium, and the vehicle of embodiments of the present disclosure, the game-related performance of a user can be improved in a gaming environment provided in the cabin of a vehicle.

DETAILED DESCRIPTION

An embodiment of the present disclosure will be described below, with reference to the drawings.

Figure 1:
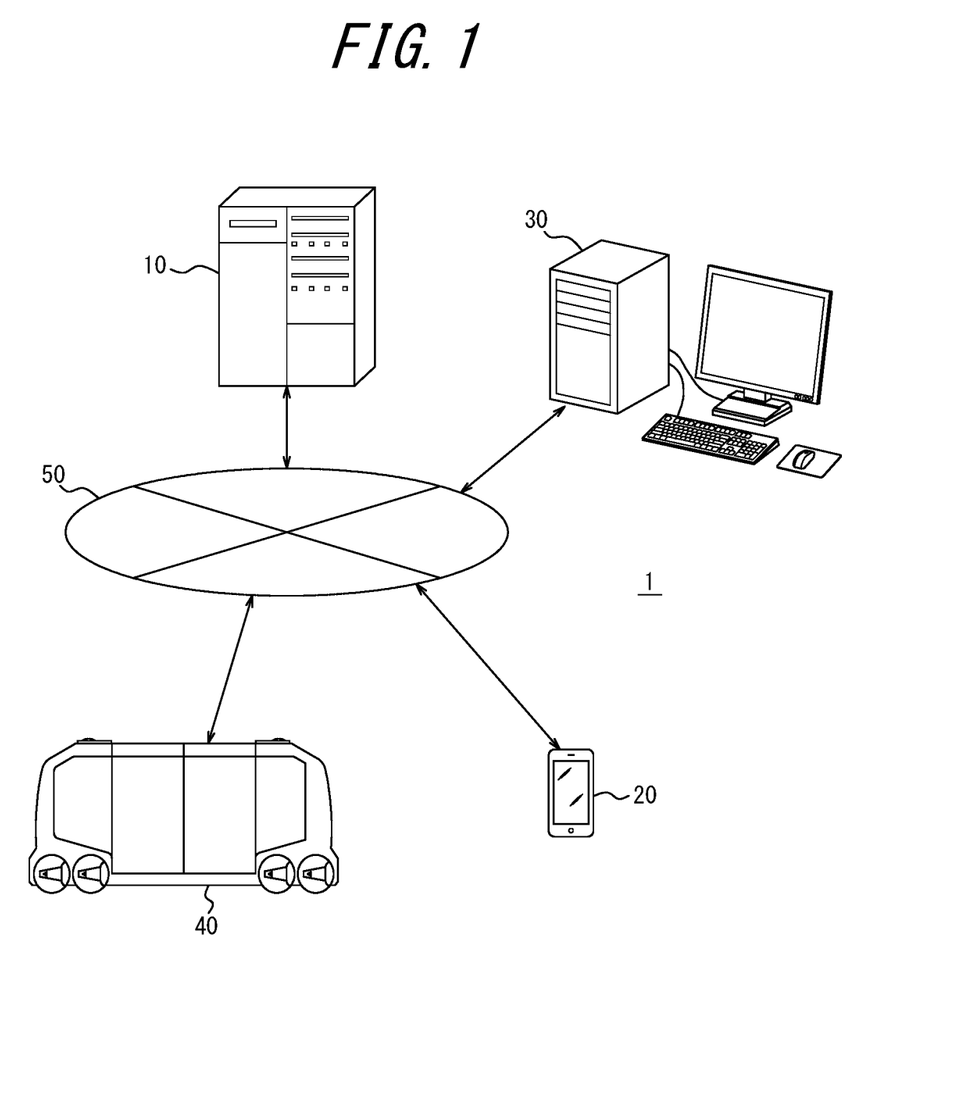
FIG. 1 is a configuration diagram illustrating a configuration of an information processing system that includes an information processing apparatus according to an embodiment of the present disclosure.

FIG. 1 is a configuration diagram illustrating a configuration of an information processing system 1 that includes an information processing apparatus 10 according to an embodiment of the present disclosure. Referring to FIG. 1, an outline of the information processing system 1 that includes the information processing apparatus 10 according to the embodiment of the present disclosure will be primarily described. The information processing system 1 includes a first terminal apparatus 20, a second terminal apparatus 30, and a vehicle 40, in addition to the information processing apparatus 10. For the sake of explanation, only one of each of the information processing apparatus 10, the first terminal apparatus 20, the second terminal apparatus 30, and the vehicle 40 is illustrated in FIG. 1, but the number of information processing apparatuses 10, first terminal apparatuses 20, second terminal apparatuses 30, and vehicles 40 may be two or more of each.

The information processing apparatus 10, the first terminal apparatus 20, the second terminal apparatus 30, and the vehicle 40 are each connected to a network 50, examples of which include a mobile object communication network and the Internet, so as to communicate with each other. At least part of the information processing system 1 is used for providing a mobility service (MaaS: Mobility as a Service). Service providers can each provide mobility services, such as mobile game events, using the vehicle 40.

As used herein, a "game event" includes, for example, any event that provides the user with an opportunity to play a game. For example, the game event may include an event related to e-sports, in which a match in a video game is played as a sporting competition. As used herein, "games" include video games, for example. The "games" are not limited to this example and may include any games other than video games, such as card games.

The number of users participating in the game event held in the vehicle 40 may be one or more. The users participating in the game event may be beginners with respect to the game that can be played at the game event or may be experienced players.

The information processing apparatus 10 assists in providing a gaming environment in the cabin of the vehicle 40. The information processing apparatus 10 is a single server apparatus or a plurality of server apparatuses that can communicate with each other. The information processing apparatus 10 is not limited to these, and may be any general purpose electronic device such as a personal computer (PC) or a smartphone, or may be any other electronic device that is dedicated to the information processing system 1.

The first terminal apparatus 20 is, for example, a general purpose electronic device such as a smartphone or a PC. The first terminal apparatus 20 is, for example, an electronic device used by a user wishing to participate in a game event held in the cabin of the vehicle 40. The first terminal apparatus 20 is not limited to these, and may be an electronic device that is dedicated to the information processing system 1.

The second terminal apparatus 30 is, for example, a general purpose electronic device such as a PC or a smartphone. The second terminal apparatus 30 is, for example, an electronic device used by staff members at an operating company that operates the game event held in the cabin of vehicle 40. The second terminal apparatus 30 is not limited to these examples and may be one server apparatus, or a plurality of server apparatuses that can communicate with each other, used by the operating company. The second terminal apparatus 30 may also be a dedicated electronic device for the information processing system 1.

The vehicle 40 provides a gaming environment in the cabin with the assistance of the information processing apparatus 10. The vehicle 40 is, for example, an automobile. The vehicle 40 is not limited to being an automobile and may be any vehicle, ridden by a passenger, that enables a game event to be held in the cabin of vehicle 40. The vehicle 40 may be moving or stopped while the game event is being held. The vehicle 40 is, for example, a vehicle that performs autonomous driving. The autonomous driving may include any level from Level 1 to Level 5 as defined by the Society of Automotive Engineers (SAE), for example, but is not limited to these, and may be defined in any way. The vehicle 40 is not limited to a vehicle that performs autonomous driving, and may be any vehicle driven by a driver.

As a summary of one embodiment, the information processing apparatus 10 for assisting in providing a gaming environment in the cabin of the vehicle 40 acquires, for each user, gaming environment information and play information associated with the gaming environment information when the user plays a game using the gaming environment. As used herein, the "gaming environment information" includes, for example, one or more gaming environments associated with each user. In the case of video games, for example, the "gaming environment" includes environments constructed from any configuration necessary to play a game, such as a PC, a display, a keyboard, a mouse, headphones, a microphone, and a chair in which a user sits during play. As used herein, the "play information" includes a play number, a play score, and the like associated with each gaming environment of a user included in the gaming environment information. The information processing apparatus 10 optimizes the gaming environment provided to one user based on the acquired gaming environment information and play information.

To summarize one embodiment, the information processing apparatus 10 obtains event information for a game event to be held in the vehicle 40. As used herein, "event information" includes, for example, a venue, a start date and time, an end date and time, the content of the game to be played, and the like. The information processing apparatus 10 acquires user information for a user who wishes to play a game in the game event. As used herein, "user information" includes, for example, an address, the date the user can participate, the content of the game the user wishes to play, and the like. Based on the acquired event information and user information, the information processing apparatus 10 determines a prescribed game event and user, from among a plurality of game events and users, so that the content of the event information and the content of the user information match. The information processing apparatus 10 notifies the determined user of the event information for the corresponding game event.

Figure 2:
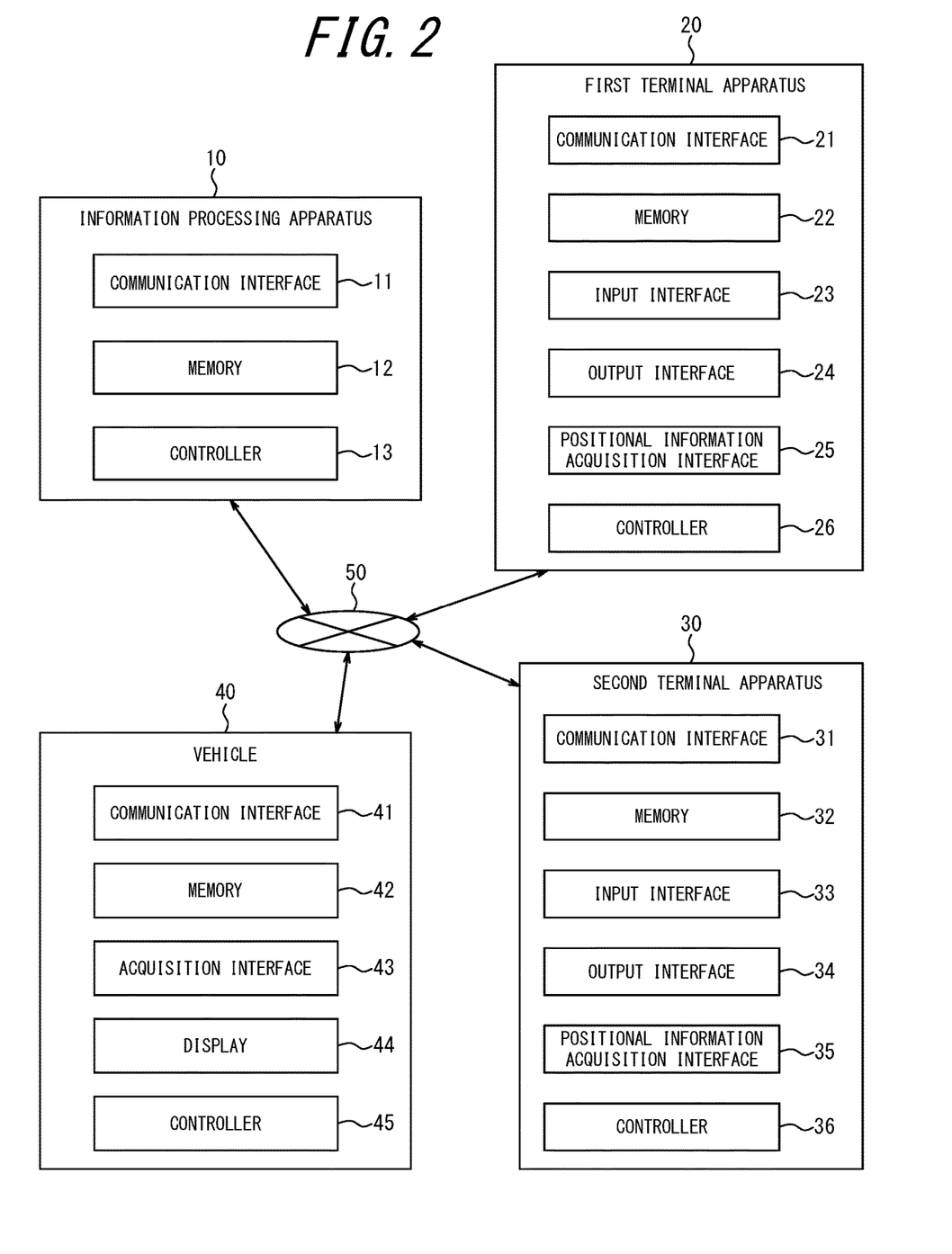
FIG. 2 is a functional block diagram illustrating schematic configurations of the information processing apparatus, the first terminal apparatus, the second terminal apparatus, and the vehicle of FIG. 1.

Next, referring to FIG. 2, configurations of the information processing apparatus 10, the first terminal apparatus 20, the second terminal apparatus 30, and the vehicle 40 included in the information processing system 1 are mainly described. FIG. 2 is a functional block diagram illustrating schematic configurations of the information processing apparatus 10, the first terminal apparatus 20, the second terminal apparatus 30, and the vehicle 40 of FIG. 1.

As illustrated in FIG. 2, the first terminal apparatus 20 includes a communication interface 21, a memory 22, an input interface 23, an output interface 24, a positional information acquisition interface 25, and a controller 26.

The communication interface 21 includes a communication module connected to the network 50. For example, the communication interface 21 may include a communication module compliant with mobile communication standards such as the 4th Generation (4G) and the 5th Generation (5G) standards. In an embodiment, the first terminal apparatus 20 is connected to the network 50 via the communication interface 21. The communication interface 21 transmits and receives various information via the network 50.

The memory 22 is, for example, a semi-conductor memory, a magnetic memory, an optical memory, or the like, but is not limited to these. The memory 22 may function as, for example, a main memory, an auxiliary memory, or a cache memory. The memory 22 stores any information used in operation of the first terminal apparatus 20. The memory 22 stores, for example, the above-described user information and event information, as well as transportation information, described below. For example, the memory 22 may store a system program, an application program, various types of information received by the communication interface 21, and the like. Information stored in the memory 22 may be updated with, for example, information received from the network 50 via the communication interface 21.

The input interface 23 includes at least one input interface for detecting user input to acquire input information based on an operation by a user. For example, the input interface 23 may be a physical key, a capacitive key, a touch screen integrally provided with the display of the output interface 24, or a microphone that receives audio input, but these examples are not limiting.

The output interface 24 includes at least one output interface for outputting information to notify the user. The output interface 24 is, for example, a display for outputting the information in the form of an image, a speaker for outputting the information in the form of audio, or the like, but is not limited to these.

The positional information acquisition interface 25 includes at least one receiver compliant with a satellite positioning system. For example, the positional information acquisition interface 25 may include a Global Positioning System (GPS) receiver. The positional information acquisition interface 25 acquires a measured value of the position of the first terminal apparatus 20 as positional information. The positional information includes, for example, an address, a latitude, a longitude, an altitude, and the like. The positional information acquisition interface 25 may acquire the positional information for the first terminal apparatus 20 continuously, periodically, or non-periodically.

The controller 26 includes at least one processor. The "processor" is a general purpose processor or a dedicated processor that is dedicated to specific processing in an embodiment but is not limited to these. The controller 26 is connected to each component included in the first terminal apparatus 20 so as to communicate with each component, and controls operation of the entire first terminal apparatus 20.

When the input interface 23 detects an operation by the user requesting registration of the user information, the controller 26 displays an input screen, via the output interface 24, indicating items required for registration of the user information. Items necessary for registration of the user information include, for example, items such as the address of the user, the date the user can participate in the same event, the content of the game the user wishes to play, and the like. The controller 26 acquires input information regarding these items that the user inputs by operating the input interface 23. The controller 26 transmits the acquired input information as user information to the information processing apparatus 10 via the communication interface 21 and the network 50.

The controller 26 receives event information, from the information processing apparatus 10 via the network 50 and the communication interface 21, of a prescribed game event determined by the information processing apparatus 10 so that the content of the event information and the content of the user information match. The user learns the venue of the game event, the starting date and time, the end date and time, the content of the game, and the like from the event information of which the first terminal apparatus 20 provided notification. The user may move to the position of the vehicle 40 at the indicated venue by the indicated start date and time to participate in the game event.

The controller 26 receives, from the information processing apparatus 10 via the network 50 and the communication interface 21, the event information for a prescribed game event and transportation information, for the vehicle 40 to transport the user, as determined by the information processing apparatus 10 based on the user information for the user participating in the game event. As used herein, the "transportation information" includes, for example, a transportation location, transportation route, transportation date and time, and the like for the user by the vehicle 40 as optimized in accordance with the event information for a prescribed game event and the user information for the user participating in the game event. From the transportation information of which the first terminal apparatus 20 provides notification, the user learns the transportation location, the transportation date and time, and the like of the vehicle 40 in which the game event is held. The user may be transported by the vehicle 40 based on the transportation date and time and transportation location of which notification was provided.

Next, the configuration of the second terminal apparatus 30 included in the information processing system 1 will be primarily described. As illustrated in FIG. 2, the second terminal apparatus 30 includes a communication interface 31, a memory 32, an input interface 33, an output interface 34, a positional information acquisition interface 35, and a controller 36. The description of each corresponding component of the first terminal apparatus 20 applies to the components of the second terminal apparatus 30. In the second terminal apparatus 30, the memory 32 stores the above-described event information and the user information, for example.

When the input interface 33 detects an operation by a staff member at the operating company to request registration of the event information, the controller 36 displays an input screen, via the output interface 34, indicating the items required for registration of the event information. The items necessary for registration of event information include, for example, the venue, the start date and time, the end date and time, and the content of the game to be played. The controller 36 acquires input information regarding these items that the staff member inputs by operating the input interface 33. The controller 36 transmits the acquired input information as event information to the information processing apparatus 10 via the communication interface 31 and the network 50.

The controller 36 may optionally receive user information, from the information processing apparatus 10 via the network 50 and communication interface 31, of a prescribed user determined by the information processing apparatus 10 so that the content of the event information and the content of the user information match. The staff member of the operating company learns the user information for the user who participates in the game event from the user information of which the second terminal apparatus 30 provides notification.

Next, the configuration of the vehicle 40 included in the information processing system 1 is mainly described. As illustrated in FIG. 2, the vehicle 40 includes a communication interface 41, a memory 42, an acquisition interface 43, a display 44, and a controller 45. The communication interface 41, the memory 42, the acquisition interface 43, the display 44, and the controller 45 are connected via an in-vehicle network, such as a Controller Area Network (CAN), or a dedicated line so as to communicate with each other.

The communication interface 41 includes a communication module connected to the network 50. For example, the communication interface 41 may include a communication module compliant with mobile communication standards such as the 4G and the 5G standards. In an embodiment, the vehicle 40 is connected to the network 50 via the communication interface 41. The communication interface 41 transmits and receives various information via the network 50.

The memory 42 is, for example, a semi-conductor memory, a magnetic memory, an optical memory, or the like, but is not limited to these. The memory 42 may function as, for example, a main memory, an auxiliary memory, or a cache memory. The memory 42 stores any information used in operation of the vehicle 40. For example, the memory 42 stores the gaming environment information, the play information, and the transportation information described above, as well as the display information and the biological information described below. For example, the memory 42 may store a system program, an application program, various types of information received by the communication interface 41, and the like. The information stored in the memory 42 may be updated with, for example, information received from the network 50 via the communication interface 41.

The acquisition interface 43 includes any appropriate module capable of acquiring various information when the user plays a game using the gaming environment in the cabin of the vehicle 40. For example, the acquisition interface 43 acquires the gaming environment information and the play information associated with the gaming environment information for each user. To acquire the gaming environment information, for example, the acquisition interface 43 includes a camera module and any other sensor module or the like that are installed in the cabin of the vehicle 40, are connected to the CAN, and are capable of detecting any configuration for constructing the gaming environment. To acquire the play information, for example, the acquisition interface 43 includes a storage module also included in the memory 42 and/or any other storage module or the like capable of storing the play information.

The acquisition interface 43 may acquire biological information, for each user in association with the gaming environment information, when the user plays a game using the gaming environment in the cabin of the vehicle 40. As used herein, the "biological information" includes a biological state of a user, such as EEG, cerebral blood flow, blood pressure, blood glucose level, blood amino acids, heart rate, pulse, body temperature, apparent temperature, hunger, or fatigue. To acquire the biological information, the acquisition interface 43 may include any appropriate biological sensor module or the like that is installed in the cabin of the vehicle 40 and is connected to the CAN, for example.

The biological state included in the biological information may, for example, be expressed based on any appropriate index by the acquisition interface 43 or the controller 45. For example, the biological state may be represented by any of four levels of "poor", "average", "good", and "excellent". These examples are not limiting, and the biological state may be represented by a numerical value within any appropriate numerical range. For example, the biological state may be represented by a numerical value from 0 to 100. The larger the value of the biological state, the better the biological state of the user. Conversely, the smaller the value of the biological state, the worse the biological state of the user.

In addition, the acquisition interface 43 includes one or more receivers corresponding to any appropriate satellite positioning system. For example, the acquisition interface 43 may include a GPS receiver. The acquisition interface 43 acquires a measured value of the position of the vehicle 40 as the positional information. The positional information includes, for example, an address, a latitude, a longitude, an altitude, and the like. The acquisition interface 43 may acquire the positional information for the vehicle 40 continually, periodically, or non-periodically.

The display 44 includes one or more output interfaces that display any appropriate information in the cabin of the vehicle 40 to enable the user to view the information. For example, the display 44 may be, but is not limited to, a display that is mounted on at least a portion of a wall of the cabin of the vehicle 40 and outputs information as images, a projector that projects images onto at least a portion of the wall, or the like.

The controller 45 includes at least one processor. The "processor" is a general purpose processor or a dedicated processor that is dedicated to specific processing in an embodiment but is not limited to these. For example, the controller 45 may include an Electronic Control Unit (ECU). The controller 45 is connected with the components of the vehicle 40 so as to communicate with the components and controls operation of the entire vehicle 40.

The controller 45 acquires, for each user via the acquisition interface 43, the gaming environment information when the user plays a game using the gaming environment in the cabin of the vehicle 40 and the play information associated with the gaming environment information. The controller 45 transmits the acquired gaming environment information and play information to the information processing apparatus 10 via the communication interface 41 and the network 50.

The controller 45 provides one user with a gaming environment optimized by the information processing apparatus 10 for the one user based on the gaming environment information and the play information acquired by the information processing apparatus 10 from the vehicle 40. For example, various types of components for constructing a gaming environment may be housed in the cabin of the vehicle 40. At this time, the controller 45 provides predetermined components for constructing a gaming environment that is optimized to one user. For example, the controller 45 may control an actuator attached to a storage box containing the predetermined components so that the actuator opens storage box. For example, the controller 45 may control an arm installed in the cabin of the vehicle 40 so as that the arm takes the predetermined components from the storage box containing the components and carries the components to the user's position.

The controller 45 receives, from the information processing apparatus 10 via the network 50 and the communication interface 41, display information determined by the information processing apparatus 10 to match the content of the game played by the user utilizing the gaming environment. The controller 45 displays the display information obtained from the information processing apparatus 10 on a wall of the cabin of the vehicle 40 via the display 44. As used herein, the "display information" includes, for example, a real-time game image of the game played by the user, as well as a theme image of the game, a background image of the game world, a character image, and the like.

The controller 45 may acquire, for each user via the acquisition interface 43, biological information in association with the gaming environment information when the user plays the game using the gaming environment in the cabin of the vehicle 40. The controller 45 may transmit the acquired biological information to the information processing apparatus 10 via the communication interface 41 and the network 50.

The controller 45 may provide one user with a gaming environment optimized by the information processing apparatus 10 for the user based on the biological information acquired by the information processing apparatus 10 from the vehicle 40. For example, various types of components for constructing a gaming environment may be contained in the cabin of the vehicle 40. At this time, the controller 45 provides predetermined components for constructing a gaming environment that is optimized to one user. For example, the controller 45 may control the actuator attached to the storage box containing the predetermined components so that the actuator opens the storage box. For example, the controller 45 may control the arm installed in the cabin of the vehicle 40 so as that the arm takes the predetermined components from the storage box containing the components and carries the components to the user's position.

The controller 45 executes vehicle control pertaining to the vehicle 40, for example, based on the control information received from the information processing apparatus 10. The vehicle control is, for example, autonomous driving control that guides the vehicle 40 to the transportation location of the user in accordance with the transportation route based on the above-described transportation information determined by the information processing apparatus 10, but this example is not limiting. The controller 45 receives updated information, such as system programs, from the information processing apparatus 10 via the network 50 and the communication interface 41.

The controller 45 acquires various types of vehicle information pertaining to the vehicle 40 from the ECU or the like, for example. As used herein, the "vehicle information" includes, for example, speed, acceleration, position, autonomous driving conditions, and the like. The controller 45 transmits the vehicle information to the information processing apparatus 10 via the communication interface 41 and the network 50.

Next, the configuration of the information processing apparatus 10 included in the information processing system 1 will be primarily described. As illustrated in FIG. 2, the information processing apparatus 10 includes a communication interface 11, a memory 12, and a controller 13.

The communication interface 11 includes a communication module connected to the network 50. For example, the communication interface 11 may include a communication module compliant with mobile communication standards such as the 4G and the 5G standards or Internet standards. In an embodiment, the information processing apparatus 10 is connected to the network 50 via the communication interface 11. The communication interface 11 transmits and receives various information via the network 50.

The memory 12 is, for example, a semi-conductor memory, a magnetic memory, an optical memory, or the like, but is not limited to these. The memory 12 may function as, for example, a main memory, an auxiliary memory, or a cache memory. The memory 12 stores any information used in operation of the information processing apparatus 10. The memory 12 stores, for example, the gaming environment information, the play information, the display information, the biological information, the event information, the user information, and the transportation information described above. For example, the memory 12 may store a system program, an application program, various types of information received by the communication interface 11, and the like. Information stored in the memory 12 may be updated with, for example, information received from the network 50 via the communication interface 11.

The controller 13 includes at least one processor. The "processor" is a general purpose processor or a dedicated processor that is dedicated to specific processing in an embodiment but is not limited to these. The controller 13 is connected to each component included in the information processing apparatus 10 so as to communicate with each component, and controls operation of the entire information processing apparatus 10.

For each user, the controller 13 receives, from the vehicle 40 via the network 50 and the communication interface 11, the gaming environment information when the user plays the game using the gaming environment in the cabin of the vehicle 40, and the play information associated with the gaming environment information. For example, the controller 13 may acquire the gaming environment information and the play information in real time for each instance of play while the user plays the game or may collectively acquire this information, accumulated in the memory 42 of the vehicle 40, at a predetermined timing.

Figure 3:
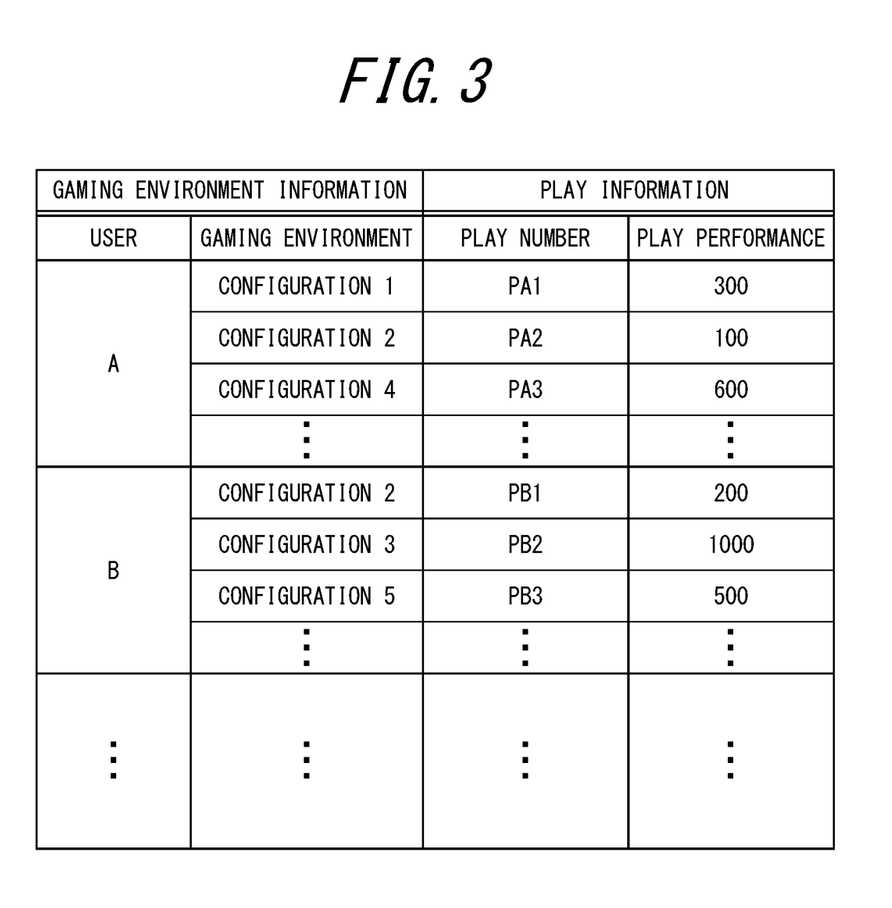
FIG. 3 illustrates an example of gaming environment information and play information acquired by the controller of the information processing apparatus of FIG. 2.

FIG. 3 is a diagram illustrating examples of the gaming environment information and the play information acquired by the controller 13 of the information processing apparatus 10 of FIG. 2. Referring to FIG. 3, examples of the gaming environment information and the play information acquired by the controller 13 are described more specifically.

The controller 13 acquires the gaming environment information to which one or more gaming environments are associated for each user. For example, a gaming environment 1 constructed from a configuration 1, a gaming environment 2 constructed from a configuration 2, a gaming environment 4 constructed from a configuration 4, and the like, which are necessary for playing a game, are associated with user A. Similarly, a gaming environment 2 constructed from a configuration 2, a gaming environment 3 constructed from a configuration 3, a gaming environment 5 constructed from a configuration 5, and the like, which are necessary for playing a game, are associated with user B. User A and user B are illustrated as representative examples in the gaming environment information illustrated in FIG. 3, but the number of users included in the gaming environment information may instead be one or may be three or more.

Similarly, the controller 13 acquires play information associated with each gaming environment. For example, a play number PA1 and a play score 300 are associated with the gaming environment 1 of user A. For example, a play number PA2 and a play score 100 are associated with the gaming environment 2 of user A. For example, a play number PA3 and a play score 600 are associated with the gaming environment 4 of user A. For example, a play number PB1 and a play score 200 are associated with the gaming environment 2 of user B. For example, a play number PB2 and a play score 1000 are associated with the gaming environment 3 of user B. For example, a play number PB3 and a play score 500 are associated with the gaming environment 5 of user B.

The controller 13 optimizes the gaming environment provided to one user based on the acquired gaming environment information and play information. For example, while referring to the gaming environment information and the play information for user A, the controller 13 judges that user A's play performance is best when playing the game using the gaming environment 4 constructed from configuration 4. At this time, the controller 13 determines, for example, that the gaming environment to be provided next to user A in the cabin of the vehicle 40 is the gaming environment 4. In this way, the controller 13 determines the gaming environment that yielded the best play performance based on past gaming environment information and play information acquired so far for one user and controls the vehicle 40 to provide the gaming environment to the one user, for example. In greater detail, the controller 13 transmits control information, for the vehicle 40 to provide one user with the determined gaming environment, to the vehicle 40 via the communication interface 11 and the network 50. The controller 13 thereby supports vehicle control by the vehicle 40 to provide the determined gaming environment to one user.

This example is not limiting, and the controller 13 may, for example, control the vehicle 40 to determine the gaming environment that yielded the best play performance and provide the gaming environment to one user based on past gaming environment information and play information acquired so far for the one user and other users. For example, while referring to the gaming environment information and the play information for each of the users A and B, the controller 13 may judge that user B's play performance is best when playing the game using the gaming environment 3 constructed from configuration 3. At this time, the controller 13 may determine that the gaming environment to be provided next to user A in the cabin of the vehicle 40 is the gaming environment 3, for example, to further improve the play performance of user A.

The controller 13 may determine the display information displayed on a wall of the cabin of the vehicle 40 to conform to the content of the game played by the user using the gaming environment. The controller 13 may transmit the determined display information to the vehicle 40 via the communication interface 11 and the network 50.

The controller 13 may receive biological information, in association with the gaming environment information, for each user from the vehicle 40 via the network 50 and the communication interface 11 when the user plays the game using the gaming environment in the cabin of the vehicle 40. For example, the controller 13 may acquire the biological information in real time for each instance of play while the user is playing a game or may, at a predetermined timing, collectively acquire biological information accumulated in the memory 42 of the vehicle 40.

Figure 4:
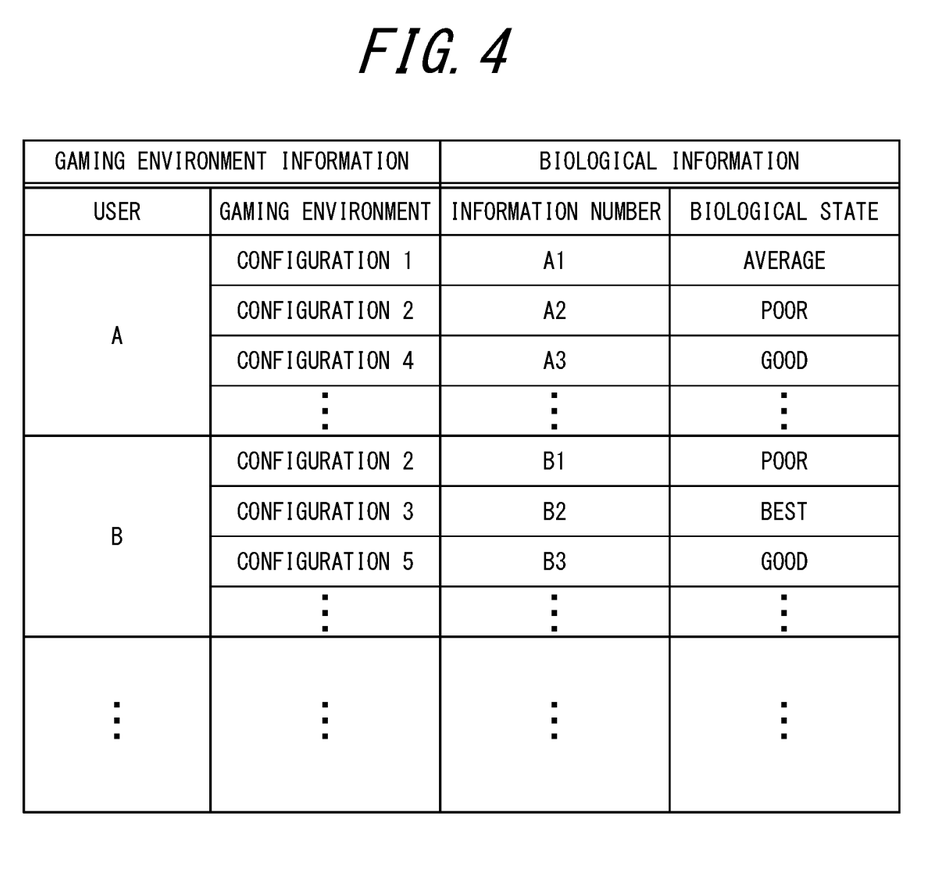
FIG. 4 illustrates an example of biological information acquired by the controller of the information processing apparatus of FIG. 2.

FIG. 4 illustrates an example of the biological information acquired by the controller 13 of the information processing apparatus 10 of FIG. 2. Referring to FIG. 4, an example of the biological information acquired by the controller 13 is described in greater detail.

The controller 13 acquires biological information associated with the gaming environment information. For example, in the gaming environment 1 constructed from configuration 1 for user A, the information number A1 of the biological information and the biological state of "normal" are associated with each other. For example, in the gaming environment 2 constructed from configuration 2 for user A, the information number A2 of the biological information and the biological state of "poor" are associated with each other. For example, in the gaming environment 4 constructed from configuration 4 for user A, the information number A3 of the biological information and the biological state of "good" are associated with each other. For example, in the gaming environment 2 constructed from configuration 2 for user B, the information number B1 of the biological information and the biological state of "poor" are associated with each other. For example, in the gaming environment 3 constructed from configuration 3 for user B, the information number B2 of the biological information and the biological state of "best" are associated with each other. For example, in the gaming environment 5 constructed from configuration 5 for user B, the information number B3 of the biological information and the biological state of "good" are associated with each other.

In addition to the gaming environment information and the play information described above, the controller 13 may optimize the gaming environment provided to one user based on the acquired biological information. For example, while referring to the gaming environment information and the play information for user A, the controller 13 judges that the play performance when the game is played using the gaming environment 4 constructed from configuration 4 is best for user A, as described above. Furthermore, while referring to the biological information for the user A, the controller 13 judges that the biological state is best for user A when the game is played using the gaming environment 4 constructed from configuration 4. At this time, the controller 13 determines, for example, that the gaming environment 4 is the gaming environment to be provided next to user A in the cabin of the vehicle 40. In this way, the controller 13 may determine the gaming environment that yielded the best biological state, in addition to the play performance, based on past biological information acquired so far for one user, and may control the vehicle 40 to provide the gaming environment to the one user. In greater detail, the controller 13 transmits control information for the vehicle 40 to provide one user with the determined gaming environment to the vehicle 40 via the communication interface 11 and the network 50. The controller 13 thereby supports vehicle control by the vehicle 40 to provide the determined gaming environment to one user.

This example is not limiting, and the controller 13 may, for example, determine the gaming environment that yielded the best biological state, in addition to the play performance, based on past biological information acquired so far for one user and other users and may control the vehicle 40 to provide the gaming environment to the one user. For example, while referring to the gaming environment information and the play information for each of the users A and B, the controller 13 may judge that the play performance when the game is played using the gaming environment 3 constructed from configuration 3 is best for user B, as described above. Furthermore, while referring to the biological information for each of the users A and B, the controller 13 may judge that the biological information state when the game is played using the gaming environment 3 constructed from configuration 3 is the best for user B. At this time, the controller 13 may determine that the gaming environment 3 is the gaming environment to be provided next to user A in the cabin of the vehicle 40, for example, to further improve the biological state of the user A.

The controller 13 may receive event information for a game event held in the vehicle 40 from the second terminal apparatus 30 via the network 50 and the communication interface 11. The controller 13 may receive user information for a user wishing to play a game in a game event from the first terminal apparatus 20 via the network 50 and the communication interface 11. The controller 13 may determine a prescribed game event and a prescribed user, from among a plurality of game events and users, based on the received event information and user information so that the content of the event information and the content of the user information match. The controller 13 may notify the determined user of the event information for the corresponding game event. For example, the controller 13 may transmit event information for the corresponding game event to the first terminal apparatus 20 of the user via the communication interface 11 and the network 50.

Figure 5:
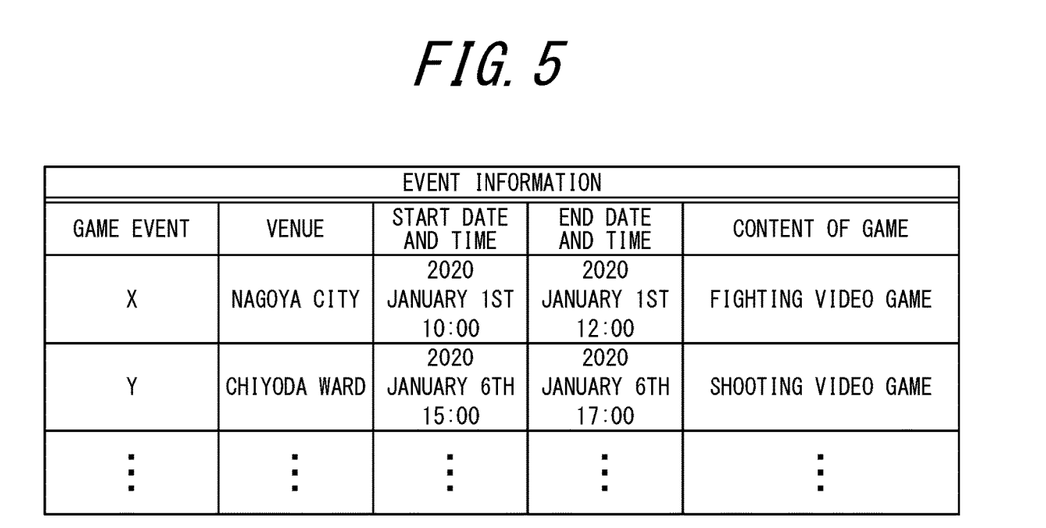
FIG. 5 illustrates an example of event information acquired by the controller of the information processing apparatus of FIG. 2.

FIG. 5 illustrates an example of event information acquired by the controller 13 of the information processing apparatus 10 of FIG. 2. Referring to FIG. 5, an example of event information acquired by the controller 13 is described in greater detail.

The controller 13 acquires the event information for a game event X to be held in the vehicle 40. In the event information for the game event X, the venue is Nagoya City. The start date and time is Jan. 1, 2020, 10:00, and the end date and time is Jan. 1, 2020, 12:00. The game to be played in the game event X is a fighting video game. The controller 13 acquires the event information for a game event Y to be held in the vehicle 40. In the event information for the game event Y, the venue is Chiyoda Ward. The start date and time is Jan. 6, 2020, 15:00, and the end date and time is Jan. 6, 2020, 17:00. The game to be played in the game event Y is a shooting video game. The game event X and the game event Y are illustrated as representative examples in the event information illustrated in FIG. 5, but the number of game events included in the event information may be one, or the number may be three or more.

Figure 6:
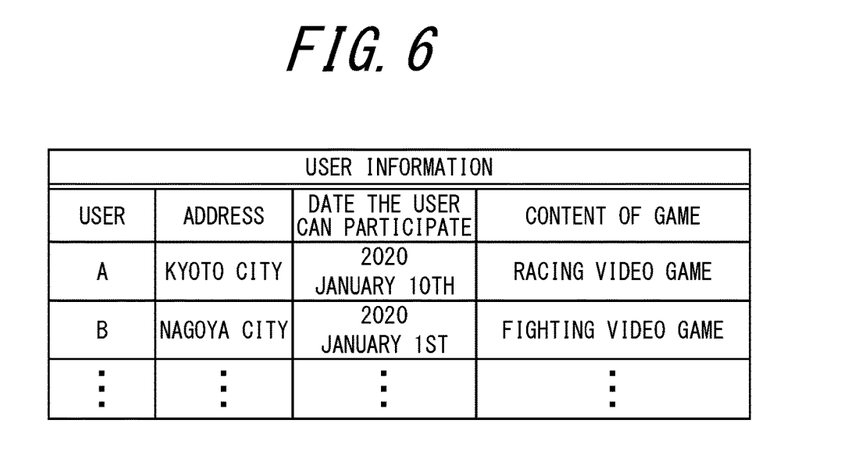
FIG. 6 illustrates an example of user information acquired by the controller of the information processing apparatus of FIG. 2.

FIG. 6 illustrates an example of user information acquired by the controller 13 of the information processing apparatus 10 of FIG. 2. Referring to FIG. 6, an example of the user information acquired by the controller 13 is described in greater detail.

The controller 13 acquires the user information for user A who wishes to play a game in a game event. In the user information for user A, the address of user A is Kyoto City. User A can participate on Jan. 10, 2020, and the game the user wishes to play is a race video game. The controller 13 also acquires the user information for user B who wishes to play a game in the game event. In the user information for user B, the address of user B is Nagoya City. User B can participate on Jan. 1, 2020, and the game the user wishes to play is a fighting video game. User A and user B are illustrated as representative examples in the user information illustrated in FIG. 6, but the number of users included in the user information may be one or may be three or more.

At this time, the venue of the game event X, the start and end date and time, and the content of the game correspond respectively to the address of user B, the date user B can participate, and the content of the game user B wishes to play. Therefore, the controller 13 extracts the event information associated with the game event X and the user information associated with the user B from the acquired event information for each game event and the user information for each user. The controller 13 thereby determines the combination of the prescribed game event X and the user B. In response to this result, the controller 13 notifies the determined user B of the event information for the corresponding game event X.

The users wishing to play a game in a game event may, for example, include beginners and experienced players. At this time, the controller 13 may notify the determined beginners and experienced players of the event information for the corresponding game event.

The controller 13 may determine transportation information for the vehicle 40 to pick up the user based on the event information for the game event and the user information for the user participating in the game event. The controller 13 may transmit the determined transportation information to the first terminal apparatus 20 and the vehicle 40 via the communication interface 11 and the network 50.

Figure 7:
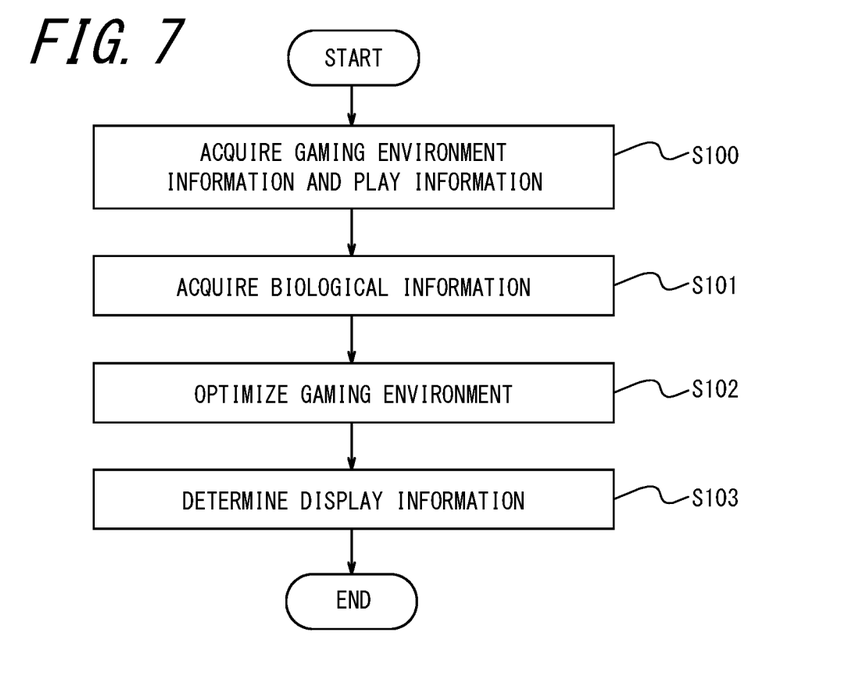
FIG. 7 is a flowchart illustrating a first example of an information processing method executed by the information processing apparatus of FIG. 1.

Next, an information processing method performed by the controller 13 of the information processing apparatus 10 according to an embodiment will be described with reference to FIGS. 7 to 10. FIG. 7 is a flowchart for explaining a first example of the information processing method executed by the information processing apparatus 10 in FIG. 1.

In step S100, the controller 13 acquires gaming environment information, and play information associated with the gaming environment information, when a user plays a game by using a gaming environment in the cabin of the vehicle 40.

In step S101, the controller 13 acquires biological information when the user plays a game using a gaming environment in the cabin of the vehicle 40 for each user in association with the gaming environment information.

In step S102, the controller 13 optimizes the gaming environment provided to one user based on the gaming environment information and the play information acquired in step S100. Additionally, the controller 13 may optimize the gaming environment provided to one user based on the biological information acquired in step S101.

In step S103, the controller 13 determines display information, to be displayed on a wall of the cabin of the vehicle 40, matching the content of the game played by the user using the gaming environment.

Figure 8:
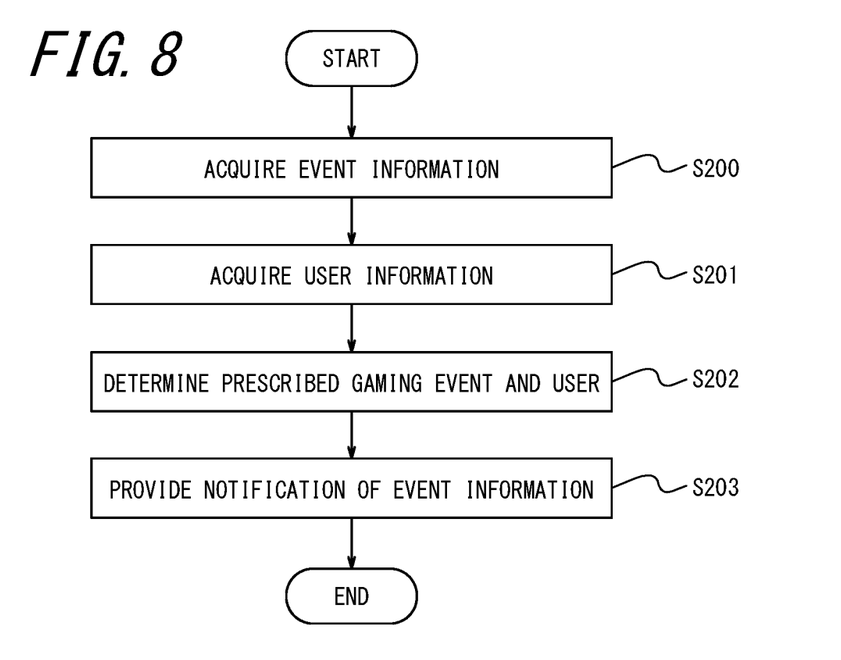
FIG. 8 is a flowchart illustrating a second example of an information processing method executed by the information processing apparatus of FIG. 1.

FIG. 8 is a flowchart for explaining a second example of the information processing method executed by the information processing apparatus 10 in FIG. 1.

In step S200, the controller 13 acquires the event information for the game event to be held in the vehicle 40.

In step S201, the controller 13 acquires the user information for a user who wishes to play a game in the game event.

In step S202, the controller 13 determines a prescribed game event and a prescribed user, among a plurality of game events and users, based on the event information acquired in step S200 and the user information acquired in step S201 so that the content of the event information and the content of the user information match.

In step S203, the controller 13 notifies the user determined in step S202 of the event information for the corresponding game event.

Figure 9:
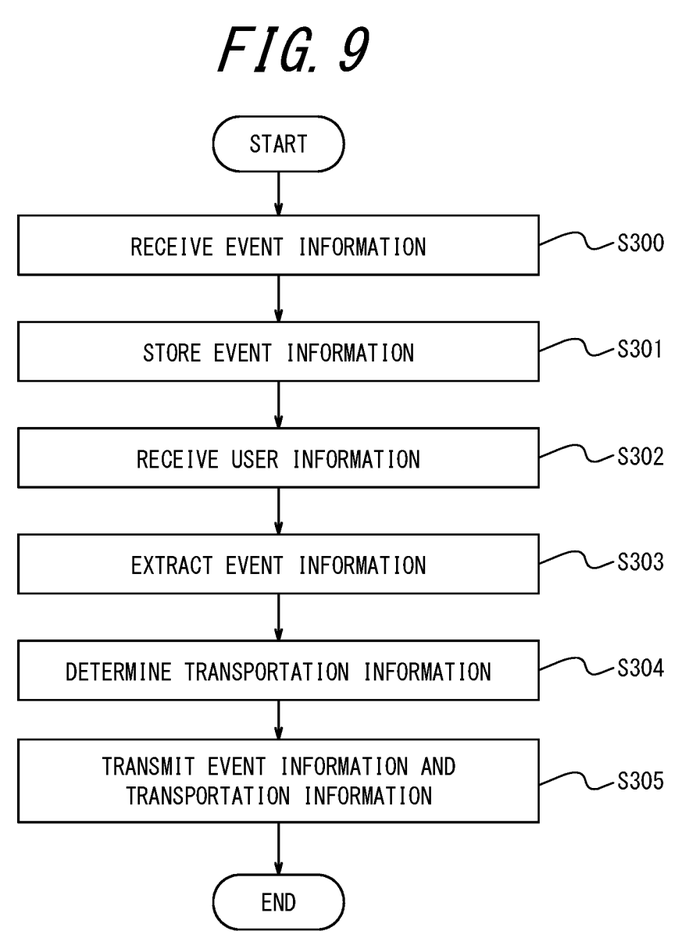
FIG. 9 is a flowchart illustrating a third example of an information processing method executed by the information processing apparatus of FIG. 1.

FIG. 9 is a flowchart for explaining a third example of the information processing method executed by the information processing apparatus 10 in FIG. 1. The flowchart in FIG. 9 illustrates the control flow of the flowchart in FIG. 8 in more detail. The flowchart in FIG. 9 illustrates the control flow when a prescribed game event and a prescribed user are determined. This control flow is triggered when a user who wishes to participate in a game event to be held in the cabin of the vehicle 40 transmits user information to the information processing apparatus 10 from the first terminal apparatus 20.

In step S300, the controller 13 receives event information for a game event to be held in the cabin of the vehicle 40 from the second terminal apparatus 30 via the network 50 and the communication interface 11.

In step S301, the controller 13 stores the event information received in step S300 in the memory 12.

In step S302, the controller 13 receives the user information from the first terminal apparatus 20 of the user via the network 50 and the communication interface 11.

In step S303, the controller 13 determines a prescribed game event and a prescribed user by extracting event information that matches the content of the user information received in step S302.

In step S304, the controller 13 determines the transportation information for the vehicle 40 to transport the prescribed user based on the event information for the prescribed game event and the user information for the prescribed user participating in the game event as determined in step S303.

In step S305, the controller 13 transmits event information for the game event corresponding to the user determined in step S303 to the first terminal apparatus 20 via the communication interface 11 and the network 50. The controller 13 transmits the transportation information determined in step S304 to the first terminal apparatus 20 and the vehicle 40 via the communication interface 11 and the network 50.

Figure 10:
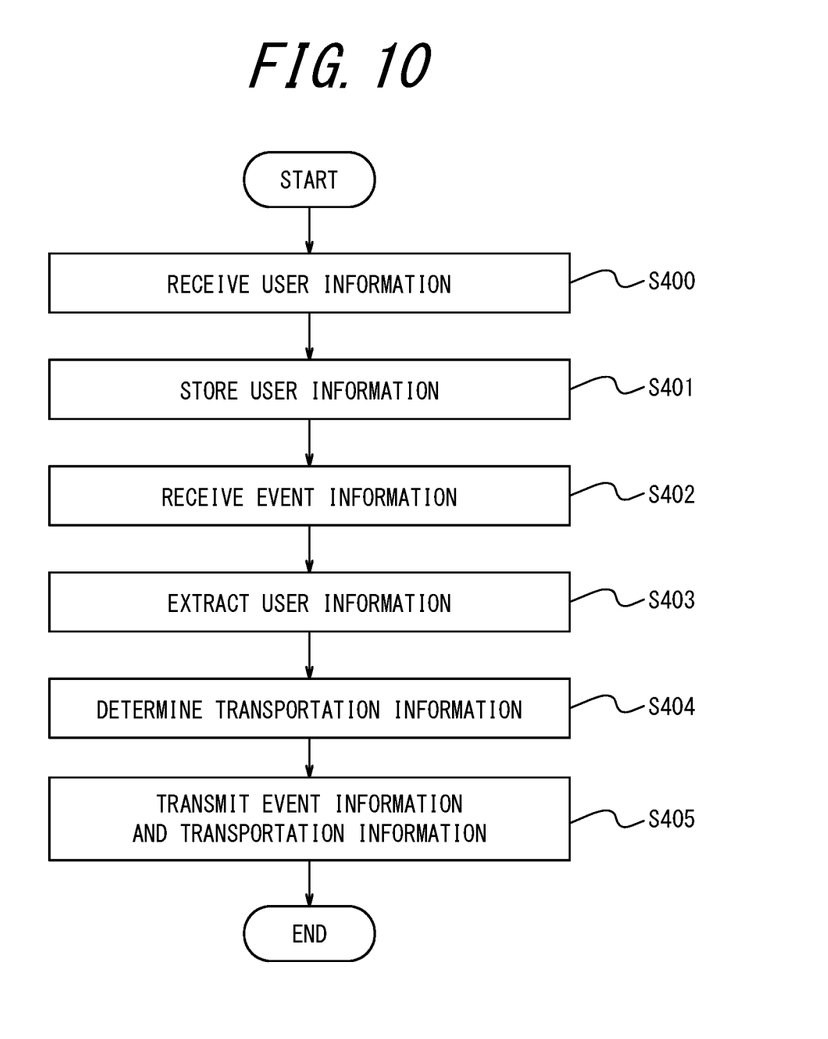
FIG. 10 is a flowchart illustrating a fourth example of an information processing method executed by the information processing apparatus of FIG. 1.

FIG. 10 is a flowchart for explaining a fourth example of the information processing method executed by the information processing apparatus 10 in FIG. 1. The flowchart in FIG. 10 illustrates the control flow of the flowchart in FIG. 8 in more detail. The flowchart in FIG. 10 illustrates the control flow when a prescribed game event and a prescribed user are determined. The control flow is triggered when a staff member of the operating company that operates the game event to be held in the cabin of the vehicle 40 transmits event information to the information processing apparatus 10 from the second terminal apparatus 30.

In step S400, the controller 13 receives user information, from the first terminal apparatus 20 via the network 50 and the communication interface 11, of the user wishing to participate in a game event to be held in the cabin of the vehicle 40.

In step S401, the controller 13 stores the user information received in step S400 in the memory 12.

In step S402, the controller 13 receives event information from the second terminal apparatus 30, which differs from the first terminal apparatus 20 of the user, via the network 50 and the communication interface 11.

In step S403, the controller 13 determines a prescribed game event and a prescribed user by extracting user information that matches the content of the event information received in step S402.

In step S404, the controller 13 determines the transportation information for the vehicle 40 to transport a prescribed user based on the event information for the prescribed game event determined in step S403 and the user information for the prescribed user participating in the game event.

In step S405, the controller 13 transmits event information for the corresponding game event to the user determined in step S403 to the first terminal apparatus 20 via the communication interface 11 and the network 50. The controller 13 transmits the transportation information determined in step S404 to the first terminal apparatus 20 and the vehicle 40 via the communication interface 11 and the network 50.

According to the above embodiment, the game performance of the user in the gaming environment provided in the cabin of the vehicle 40 can be improved. For example, by the information processing apparatus 10 optimizing the gaming environment provided to one user based on the acquired gaming environment information and play information, the user who is provided with the gaming environment in the vehicle 40 can improve performance in the game in a state matching the gaming environment. For example, even if a different user had just been using a certain gaming environment in the vehicle 40, the one user can be provided, by the vehicle 40, with a predetermined gaming environment that yielded the best play performance among the plurality of gaming environments that the one user has used in the past. For example, even if a different user had just been using a certain gaming environment in the vehicle 40, the one user can be provided, by the vehicle 40, with a predetermined gaming environment that yielded the best play performance among the plurality of gaming environments that all users have used in the past.

When the information processing apparatus 10 determines the display information to match the content of the game that the user plays using the gaming environment, and the vehicle 40 displays the display information on a wall of the cabin, the game seems more realistic to the user playing the game. This allows users who play a game using the vehicle 40 to feel as though they have entered the game world, thereby increasing the users' level of excitement and satisfaction.

The information processing apparatus 10 enables an increase in the user's game performance in the gaming environment provided in the cabin of the vehicle 40. For example, the information processing apparatus 10 optimizes the gaming environment provided to one user based on the acquired biological information, so that the user who is provided with the gaming environment in the vehicle 40 can improve game performance while maintaining a good biological state that matches the gaming environment. For example, even if a different user had just been using a certain gaming environment in the vehicle 40, the one user may be provided, by the vehicle 40, with a predetermined gaming environment that yielded the best biological state among the plurality of gaming environments that the second user has used in the past. For example, even if a different user had just been using a certain gaming environment in the vehicle 40, the one user may be provided, by the vehicle 40, with a predetermined gaming environment that yielded the best biological state among the plurality of gaming environments that all users have used in the past.

The information processing apparatus 10 determines a prescribed game event and a prescribed user, from among a plurality of game events and users, so that the content of the event information and the content of the user information match. An upcoming game event to be held at the date and time desired by the user and including the game desired by the user can therefore be recommended appropriately to the user. The user can thereby easily obtain an opportunity to play the desired game. This increases the user's degree of satisfaction with the service that holds the game event. The information processing apparatus 10 can determine a plurality of prescribed users for a prescribed game event. Unlike when the users stay in their homes or other such locations to play the game alone, these users can be gathered in the vehicle 40 and encouraged to communicate with each other directly and smoothly. When users need to cooperate with each other to make progress in the game, for example, this approach to encourage communication between users enables the users to progress smoothly in the game.

As in the control flow illustrated in FIG. 9, a prescribed game event and user are determined by the information processing apparatus 10 in response to the user transmitting user information to the information processing apparatus 10 from the first terminal apparatus 20. The optimum game event for the user information for the user is thereby selected in real time from among a plurality of game events stored in the information processing apparatus 10. This improves the convenience for users of the information processing system 1 that includes the information processing apparatus 10.

As in the control flow illustrated in FIG. 10, a prescribed game event and user are determined by the information processing apparatus 10 in response to a staff member of the operating company that operates the game event having transmitted event information to the information processing apparatus 10 from the second terminal apparatus 30. The optimal user for the event information for the game event is thereby selected in real time from among a plurality of users stored in the information processing apparatus 10. This improves convenience when the operating company uses the information processing system 1 that includes the information processing apparatus 10.

The information processing apparatus 10 notifies the determined beginners and experienced players of the event information for the corresponding game event, thereby facilitating simultaneous participation in the game event by both beginners and experienced players. As a result, beginners can directly see how the game is played by experienced players participating in the same game event. This helps beginners to improve their own game skills.

By the information processing apparatus 10 determining the transportation information based on the event information for the game event and the user information for the user participating in the game event, the vehicle 40 can transport the user by autonomous driving, for example, over the optimal route to the optimal location at the optimal time. The information processing apparatus 10 can facilitate participation in a game event by, for example, using the vehicle 40 to transport users who are physically handicapped, such as those requiring nursing care or the elderly, and would have difficulty participating in a game event outside. This improves the convenience for such users of the information processing system 1 that includes the information processing apparatus 10.

The vehicle 40 provides a gaming environment in the cabin of the vehicle, thereby providing users who could not easily construct a gaming environment on their own with opportunities for playing games in a gaming environment that is optimized. Therefore, the user does not need to own the components necessary for constructing the gaming environment and can easily participate in the game.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each configuration, each step, or the like, may be rearranged without logical inconsistency, and a plurality of configurations, steps, or the like can be combined into one, or divided.

For example, in the embodiment described above, one or some processing operations executed in the information processing apparatus 10 may be executed in the first terminal apparatus 20, the second terminal apparatus 30, and/or the vehicle 40. At least one or some processing operations executed in the first terminal apparatus 20, the second terminal apparatus 30, and/or the vehicle 40 may be executed in the information processing apparatus 10.

For example, a configuration in which a general purpose electronic device such as a smartphone, a computer, or the like may be caused to function as the information processing apparatus 10 according to the embodiment described above is possible. Specifically, a program in which processes for realizing the functions of the information processing apparatus 10 or the like according to the embodiment are written may be stored in a memory of the electronic device, and the program may be read and executed by a processor of the electronic device. Accordingly, an embodiment of the present disclosure can also be implemented as a program executable by a processor. Alternatively, an embodiment of the present disclosure can also be implemented as a non-transitory computer readable medium storing a program executable by a single processor or a plurality of processors to cause the information processing apparatus 10 or the like according to the embodiment to execute the functions. It is to be understood that these are also included within the scope of the present disclosure.

For example, in the embodiment described above, the vehicle 40 has been described as an autonomously driven vehicle, but this example is not limiting. The vehicle 40 need not be an autonomously driven vehicle. When the vehicle 40 is not an autonomously driven vehicle, routes based on received transportation information may be outputted to the driver to assist with driving along the routes.

For example, the information processing apparatus 10 described in the above embodiment may be mounted in the vehicle 40. In this case, the information processing apparatus 10 may directly communicate information with the vehicle 40 without using the network 50. The information processing system 1 need not include the first terminal apparatus 20 and the second terminal apparatus 30, and the information processing apparatus 10 mounted in the vehicle 40 may execute the above-described acquisition and notification of the information using any appropriate input interface and output interface provided in the vehicle 40.

For example, in the above embodiment, the information processing apparatus 10 has been described as determining the gaming environment that yielded the best play performance to optimize the gaming environment provided for one user, but this example is not limiting. For example, the information processing apparatus 10 may determine any appropriate gaming environment in which the play performance of the one user is improved. For example, the information processing apparatus 10 may determine any appropriate gaming environment associated with a higher score in the play performance than the immediately prior score of the one user.

For example, in the above embodiment, the information processing apparatus 10 has been described as determining the gaming environment that, in addition to play performance, yielded the best biological state to optimize the gaming environment provided for one user, but this example is not limiting. For example, the information processing apparatus 10 may determine any appropriate gaming environment in which the biological state of one user is improved. For example, the information processing apparatus 10 may determine any appropriate gaming environment associated with a better biological state than the immediately prior biological state of the one user.

For example, in the above embodiment, the first terminal apparatus 20 has been described as acquiring the address of the user from the input interface 23 as user information and transmitting the user information to the information processing apparatus 10 via the communication interface 21 and the network 50, but this example is not limiting. For example, the first terminal apparatus 20 may transmit the positional information for the first terminal apparatus 20 acquired by the positional information acquisition interface 25 to the information processing apparatus 10 as user information. Based on the received positional information for the first terminal apparatus 20, the information processing apparatus 10 may determine the transportation information for the vehicle 40 to transport the user participating in the game event.

For example, in the above embodiment, a game event may be held after a prescribed game event and user are determined by the information processing apparatus 10, or the information processing apparatus 10 may determine a prescribed game event and user in real time while a game event is held.

For example, in the above embodiment, the information processing apparatus 10 has been described as determining a prescribed game event and user by extracting particular event information and particular user information, but this example is not limiting. For example, if there is a plurality of candidates for a prescribed game event, the information processing apparatus 10 may transmit candidate information as a list to the first terminal apparatus 20 of the user. The user may review the candidate list displayed on the output interface 24 of the first terminal apparatus 20 and select the event information for a prescribed game event that the user ultimately desires.

For example, in the above embodiment, the information processing apparatus 10 has been described as determining a prescribed game event and user by extracting particular event information and particular user information, but this example is not limiting. For example, if there is a plurality of candidates for the prescribed user, the information processing apparatus 10 may transmit candidate information to the second terminal apparatus 30 as a list. The staff member of the operating company may review the candidate list displayed on the output interface 34 of the second terminal apparatus 30 and select the user information for the prescribed user that the staff member ultimately desires.

The invention claimed is:

1. An information processing apparatus for supporting provision of a vehicle gaming environment in a cabin of a vehicle, the information processing apparatus comprising a controller configured to:
   determine display information to be displayed in the cabin of the vehicle;
   acquire, for each of one or more users, (1) gaming environment information and (2) play performance information of a game associated with the gaming environment information comprising play scores associated for respective gaming environments, when the one or more users play a game using the gaming environments; and
   optimize the vehicle gaming environment provided to one user by selecting a first gaming environment for the one user based on the first gaming environment for the one user having a highest play score among all of the play scores for the respective gaming environments for the one user.

2. The information processing apparatus of claim 1, wherein the display information is configured to be displayed on a wall of the cabin of the vehicle, the display information matching content of the game that the one or more users play using the vehicle gaming environment.

3. The information processing apparatus of claim 1, wherein the controller is configured to:
   acquire, for each of the one or more users, biological information in association with the gaming environment information when the one or more users play the game using the vehicle gaming environment; and
   optimize the vehicle gaming environment provided to the one user based on the acquired biological information.

4. The information processing apparatus of claim 1, wherein the controller is configured to:
   acquire event information for a plurality of game events to be held in the vehicle and user information for the one or more users wishing to play games in the plurality of game events;
   determine, based on the acquired event information and the acquired user information, a prescribed game event and a prescribed user, from among the plurality of game events and the one or more users, such that content of event information for the prescribed game event and content of user information for the prescribed user match; and
   notify the determined prescribed user of event information for the prescribed game event corresponding to the determined prescribed user.

5. The information processing apparatus of claim 4, further comprising a communication interface, wherein
   when the controller receives the user information from a first terminal apparatus of the one or more users via the communication interface, the controller is configured to determine the prescribed game event and the prescribed user by extracting the event information matching content of the received user information and transmit, to the first terminal apparatus, the event information for the prescribed game event corresponding to the determined prescribed user via the communication interface.

6. The information processing apparatus of claim 4, further comprising a communication interface, wherein
   when the controller receives the event information from a second terminal apparatus different from a first terminal apparatus of the one or more users via the communication interface, the controller is configured to determine the prescribed game event and the prescribed user by extracting the user information matching content of the received event information and transmit, to the first terminal apparatus, the event information for the prescribed game event corresponding to the determined prescribed user via the communication interface.

7. The information processing apparatus of claim 4, wherein
   the one or more users wishing to play games in the plurality of game events include a beginner and an experienced player, and
   the controller is configured to notify a determined beginner and a determined experienced player of event information for the prescribed game event corresponding to the determined beginner and the determined experienced player.

8. The information processing apparatus of claim 4, wherein based on the event information for the prescribed game event and user information for the prescribed user participating in the prescribed game event, the controller is configured to determine transportation information for the vehicle to transport the prescribed user.

9. An information processing system comprising:
   the information processing apparatus of claim 1; and
   the vehicle, which is configured to transmit the gaming environment information and the play information associated with the gaming environment information to the information processing apparatus.

10. A non-transitory computer readable medium storing a program configured to cause an information processing apparatus for supporting provision of a vehicle gaming environment in a cabin of a vehicle, to execute operations comprising:
determining display information to be displayed in the cabin of the vehicle;
acquire, for each of one or more users, (1) gaming environment information and (2) play performance information of a game associated with the gaming environment information comprising play scores associated for respective gaming environments, when the one or more users play a game using the gaming environments; and
optimize the vehicle gaming environment provided to one user by selecting a first gaming environment for the one user based on the first gaming environment for the one user having a highest play score among all of the play scores for the respective gaming environments for the one user.

11. The non-transitory computer readable medium of claim 10, wherein the display information is configured; to be displayed on a wall of the cabin of the vehicle, the display information matching content of the game that the one or more users play using the vehicle gaming environment.

12. The non-transitory computer readable medium of claim 10, wherein the operations further comprise acquiring, for each of the one or more users, biological information in association with the gaming environment information when the one or more users play the game using the vehicle gaming environment and optimizing the vehicle gaming environment provided to the one user based on the acquired biological information.

13. The non-transitory computer readable medium of claim 10,
wherein the operations further comprise:
acquiring event information for a plurality of game events to be held in the vehicle;
acquiring user information for the one or more users wishing to play games in the plurality of game events;
determining, based on the acquired event information and the acquired user information, a prescribed game event and a prescribed user, from among the plurality of game events and the one or more users, such that content of event information for the prescribed game event and content of user information for the prescribed user match; and
notifying the determined prescribed user of event information for the prescribed game event corresponding to the determined prescribed user.

14. The non-transitory computer readable medium of claim 13, wherein
the acquiring the user information comprises receiving the user information from a first terminal apparatus of the one or more users,
the determining the prescribed game event and the prescribed user comprises extracting the event information that matches content of the received user information, and
the notifying the event information comprises transmitting, to the first terminal apparatus, the event information for the prescribed game event corresponding to the determined prescribed user.

15. The non-transitory computer readable medium of claim 13, wherein
the acquiring the event information comprises receiving the event information from a second terminal apparatus different from a first terminal apparatus of the one or more users,
the determining the prescribed game event and the prescribed user comprises extracting the user information that matches content of the received event information, and
the notifying the event information comprises transmitting, to the first terminal apparatus, the event information for the prescribed game event corresponding to the determined prescribed user.

16. The non-transitory computer readable medium of claim 13, wherein
the one or more users wishing to play games in the plurality of game events include a beginner and an experienced player, and
the notifying the event information comprises notifying a determined beginner and a determined experienced player of event information for the prescribed game event corresponding to the determined beginner and the determined experienced player.

17. The non-transitory computer readable medium of claim 13, wherein the operations further comprise determining, based on the event information for the prescribed game event and user information for the prescribed user participating in the prescribed game event, transportation information for the vehicle to transport the prescribed user.

18. A vehicle for providing a vehicle gaming environment in a cabin of the vehicle with assistance from an information processing apparatus, the vehicle comprising:
a controller configured to:
determine display information to be displayed in the cabin of the vehicle;
acquire, for each of one or more users, (1) gaming environment information and (2) play performance information of a game associated with the gaming environment information comprising play scores associated for respective gaming environments, when the one or more users play a game using the gaming environments; and
provide one user with the vehicle gaming environment optimized for the one user by the information processing apparatus by providing the one user with a first gaming environment based on the first gaming environment for the one user having a highest play score among all of the play scores for the respective gaming environments for the one user.

19. The vehicle of claim 18, wherein the controller is configured to acquire the display information from the information processing apparatus and display the display information on a wall of the cabin of the vehicle, the display information being determined by the information processing apparatus to match content of the game that the one or more users play using the vehicle gaming environment.

20. The vehicle of claim 18, wherein the controller is configured to acquire, for each of the one or more users, biological information in association with the gaming environment information when the one or more users play the game using the vehicle gaming environment and provide the one user with the vehicle gaming environment optimized for the one user by the information processing apparatus based on the biological information acquired from the vehicle by the information processing apparatus.

* * * * *